(12) United States Patent
Wang et al.

(10) Patent No.: US 10,020,776 B1
(45) Date of Patent: Jul. 10, 2018

(54) MONITORING SYSTEM AND MONITORING METHOD

(71) Applicant: Henan Shuimu Environmental Technology Co., Ltd., Zhengzhou (CN)

(72) Inventors: Bo Wang, Zhengzhou (CN); Shuhong Song, Zhengzhou (CN); Zhenyu Luo, Zhengzhou (CN); Wanpin Tian, Zhengzhou (CN); Shixi Wang, Zhengzhou (CN); Yuanhui Guo, Zhengzhou (CN); Yulong Chen, Zhengzhou (CN); Wanying Wang, Zhengzhou (CN); Junxia Lv, Zhengzhou (CN); Lanxiang Xing, Zhengzhou (CN); Haoran Zhang, Zhengzhou (CN); Huanhuan Xia, Zhengzhou (CN); Boheng Hao, Zhengzhou (CN)

(73) Assignee: Henan Shuimu Environmental Technology Co., Ltd., Zhengzhou (CN)

( * ) Notice: Subject to any disclaimer, the term of this patent is extended or adjusted under 35 U.S.C. 154(b) by 0 days.

(21) Appl. No.: 15/723,091

(22) Filed: Oct. 2, 2017

(51) Int. Cl.
| | |
|---|---|
| *G08B 1/08* | (2006.01) |
| *H02S 50/00* | (2014.01) |
| *G08C 17/02* | (2006.01) |
| *G08B 25/10* | (2006.01) |

(52) U.S. Cl.
CPC ............. *H02S 50/00* (2013.01); *G08B 25/10* (2013.01); *G08C 17/02* (2013.01); *G08C 2200/00* (2013.01); *G08C 2201/30* (2013.01)

(58) Field of Classification Search
CPC .......... H02S 50/00; G08B 25/10; G08C 17/02
USPC ...................................... 340/539.19
See application file for complete search history.

(56) References Cited

U.S. PATENT DOCUMENTS

| | | | |
|---|---|---|---|
| 9,312,724 B2 * | 4/2016 | Estes ....................... H02S 40/32 |
| 9,960,637 B2 * | 5/2018 | Sanders ................ G05B 15/02 |
| 2014/0159487 A1 * | 6/2014 | Han ................... H05B 37/0272 |
| | | | 307/31 |

* cited by examiner

*Primary Examiner* — John A Tweel, Jr.
(74) *Attorney, Agent, or Firm* — Kolisch Hartwell, P.C.

(57) ABSTRACT

Provided are a monitoring system and a monitoring method. The monitoring system includes a monitoring center, N data transmission systems each in communication with the monitoring center, and N data control systems each in communication with the monitoring center, with the N data control systems corresponding one-to-one to the N data transmission systems. With the monitoring system, it is possible to monitor, at anytime and anywhere, the project service and operation conditions of N solar systems arranged at different locations, timely acquire the real-time operation information of the N solar system monitoring devices arranged at different locations, and conduct, according to such information, remote and centralized control over the solar system monitoring devices. The monitoring system enhances the controllability of the solar system monitoring devices, saves and reduces the maintenance costs, improves the scientific management level, and also has functions of energy saving and environment protection.

16 Claims, 2 Drawing Sheets

MONITORING SYSTEM AND MONITORING METHOD

TECHNICAL FIELD

The invention relates to the technical field of solar energy, and particularly to a monitoring system and a monitoring method which are applicable to a solar system monitoring device.

BACKGROUND ART

As clean renewable energy, solar energy is widely used. At present, solar systems are provided in some places (e.g., residences, office buildings, hospitals, schools, gymnasia, bathing centers, aquatic amusement parks, breeding farms and industrial parks). These solar systems can be used for supplying hot water, heating or generating electricity. For each solar system, a solar system monitoring device is provided, for monitoring working states of the solar system and controlling the working states of the solar system. However, each monitoring device can only provide localized monitoring to the solar system under control thereof. In order to know the working states of the solar systems at different locations, it is required for a working staff to carry out on-site data collection. In order to change the working states of the solar systems at different locations, it is also required for a working staff to perform operations on site. In addition, it would also be impossible to found a failure of the solar system timely. All of the above make it necessary to put a great deal of manpower and resources for operations and maintenance of a plurality of solar systems arranged at different locations, resulting in high operation and maintenance costs.

DISCLOSURE OF THE INVENTION

A first object of the invention is to overcome the deficiency in the prior art, and provide a monitoring system applicable for a solar system monitoring device. With such a monitoring system, a plurality of solar system monitoring devices can be remotely monitored in a centralized manner.

A second object of the invention is to overcome the deficiency in the prior art, and provide a monitoring method applicable for a solar system monitoring device. With such a monitoring method, a plurality of solar system monitoring devices can be remotely monitored in a centralized manner.

Embodiments of the invention are realized by means of technical solutions as follows.

A monitoring system is provided, which is applicable for parallel monitoring of N solar system monitoring devices. The monitoring system includes:
  a monitoring center;
  N data transmission systems, each being in communication with the monitoring center; and
  N data control systems, each being in communication with the monitoring center, and the N data control systems corresponding one-to-one to the N data transmission systems;
  where the N data transmission systems are configured to be in communication with the N solar system monitoring devices one-to-one correspondingly, the N data control systems are configured to be in communication with the N solar system monitoring devices one-to-one correspondingly, each of the data transmission systems is configured to acquire a working parameter of a corresponding one of the solar system monitoring devices and send the working parameter to the monitoring center; each of the data control systems is configured to receive a control instruction from the monitoring center, and send, according to the control instruction, a control signal to a corresponding one of the solar system monitoring devices; and N is a positive integer greater than or equal to 2.

Furthermore, each of the data transmission systems includes a wireless signal receiving device, the wireless signal receiving device is configured to be in wireless communication with the corresponding one of the solar system monitoring devices, and in communication with the monitoring center.

Furthermore, each of the data control systems includes a wireless signal sending device, the wireless signal sending device is configured to be in wireless communication with the corresponding one of the solar system monitoring devices, and in communication with the monitoring center.

Furthermore, the working parameter includes an alarm signal, and the monitoring center is configured to send out a maintenance dispatch instruction, according to the alarm signal as well as a geographical location of the corresponding one of the solar system monitoring devices.

Furthermore, the monitoring center includes a storage system and a data processing system with the data processing system in communication with the storage system. The storage system is in communication with the N data transmission systems and configured to store the working parameter. The data processing system is configured to read the working parameter stored in the storage system, and output a working report according to the working parameter. The monitoring center further includes a display device in communication with the data processing system, and the display device is configured to receive and display the working report.

Furthermore, the working report includes at least one of a real-time working report of the solar system monitoring device, a monthly working report of the solar system monitoring device and an annual working report of the solar system monitoring device.

Furthermore, the monitoring center includes N input devices, the N input devices are in communication with the N data control systems one-to-one correspondingly, and each of the input devices is configured to send a control instruction to a corresponding one of the data control systems.

Furthermore, the working parameter includes at least one of an alarm signal, a temperature signal and a water level signal; the control signal includes a load control signal; and the control instruction includes at least one of a startup instruction, a shutdown instruction, a target temperature value and a target water level value.

A monitoring method is provided, for monitoring in parallel N solar system monitoring devices. The monitoring method includes:
  N data transmission systems acquiring working parameters of the N solar system monitoring devices, respectively, and sending the working parameters to a monitoring center;
  the monitoring center sending out a control instruction for each of the N solar system monitoring devices; and
  each of N data control systems receiving the control instruction, and sending, according to the control instruction, a control signal to a corresponding one of the solar system monitoring devices;
  where N is a positive integer greater than or equal to 2.

Furthermore, the N data transmission systems acquire, in wireless communication, the working parameters of the N solar system monitoring devices, respectively.

Furthermore, each of the N data control systems sends, in wireless communication, the control signal to the corresponding one of the solar system monitoring devices.

Furthermore, the working parameter includes an alarm signal, and the monitoring center is configured to send out a maintenance dispatch instruction, according to the alarm signal as well as a geographical location of the corresponding one of the solar system monitoring devices.

Furthermore, the monitoring center stores the working parameters from the N data transmission systems, and outputs and displays a working report according to the working parameters.

Furthermore, the working report includes at least one of a real-time working report of the solar system monitoring device, a monthly working report of the solar system monitoring device and an annual working report of the solar system monitoring device.

Furthermore, the monitoring center receives respectively input operations that a user inputs for the solar system monitoring devices, and sends the control instruction to a corresponding one of the data control systems.

Furthermore, the working parameter includes at least one of an alarm signal, a temperature signal and a water level signal; the control signal includes a load control signal; and the control instruction includes at least one of a startup instruction, a shutdown instruction, a target temperature value and a target water level value.

The technical solutions of the invention have at least the following advantages and beneficial effects:

With the monitoring system as provided by the embodiments of the invention, the working states of a plurality of solar systems arranged at different locations can be monitored simultaneously, without a need for a working staff to carry out the on-site data collection. An abnormality in the working parameter of the solar system monitoring device, i.e., a failure of the solar system, can also be timely found. Furthermore, the monitoring system can also simultaneously control, in a centralized manner, the working states of the plurality of solar systems arranged at different locations, without a need for the working staff to perform operations on site. In conclusion, by means of the monitoring system provided by the embodiments of the invention, it is possible to simultaneously and remotely monitor, in a centralized manner, the working states of the plurality of solar systems arranged at different locations, considerably reducing the operation and maintenance costs.

With the monitoring method as provided by the embodiments of the invention, the working states of a plurality of solar systems arranged at different locations can be monitored simultaneously, without a need for a working staff to carry out the on-site data collection. An abnormality in the working parameter of the solar system monitoring device, i.e., a failure of the solar system, can also be timely found. Furthermore, the monitoring method can also simultaneously control, in a centralized manner, the working states of the plurality of solar systems arranged at different locations, without a need for the working staff to perform operations on site. In conclusion, by means of the monitoring method provided by the embodiments of the invention, it is possible to simultaneously and remotely monitor, in a centralized manner, the working states of the plurality of solar systems arranged at different locations, considerably reducing the operation and maintenance costs.

BRIEF DESCRIPTION OF DRAWINGS

In order to illustrate technical solutions of embodiments of the invention more clearly, drawings that are used in the embodiments are briefly described below. It should be understood that the following drawings are merely demonstration of certain embodiments of the invention, and therefore shall not be regarded as limiting the scope thereof. For a person skilled in the art, other drawings can be obtained in light of these drawings without any inventive efforts.

Figure 1:
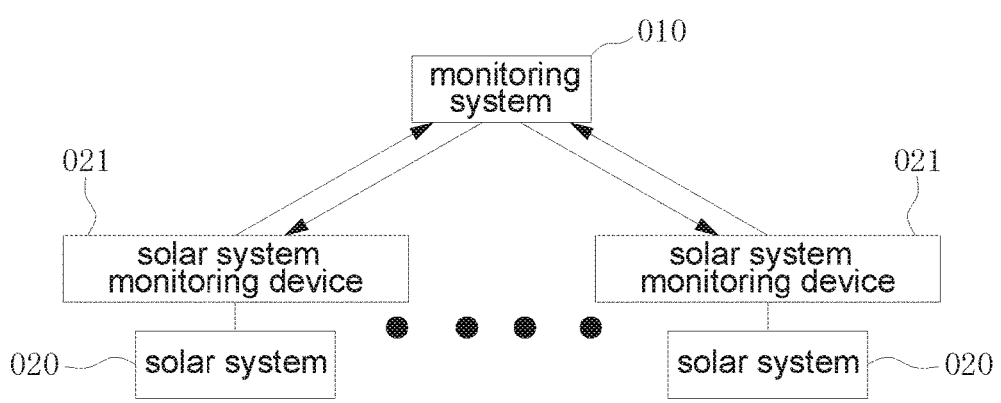
FIG. 1 is schematic diagram A of a monitoring system as provided by the embodiment.

Reference signs used in the drawings are as follows: 010—monitoring system, 101—monitoring center, 101a—storage system, 101b—data processing system, 101c—display device, 101d—input device, 102—data transmission system, 102a—wireless signal receiving device, 103—data control system, 103a—wireless signal sending device, 020—solar system, and 021—solar system monitoring device.

DETAILED DESCRIPTION OF EMBODIMENTS

In order to clarify the objects, the technical solutions and the advantages of the invention, the technical solutions of the embodiments of the invention will be described clearly and completely hereinafter, with reference to the drawings. Apparently, the described embodiments are merely part rather than all of the embodiments of the invention.

Therefore, the following detailed description of the embodiments of the invention is not intended to limit the scope of the invention as claimed, but merely represents part of the embodiments of the invention. All other embodiments, obtained by those of ordinary skill in the art based on the embodiments of the invention without any inventive effort, will fall within the scope of protection of the invention.

It should be noted that the embodiments of the invention as well as the features and the technical solutions in the embodiments can be combined mutually, provided that there is no conflict.

It should be noted that similar reference signs and letters in the drawings below denote similar items. Therefore, once a certain item is defined in one drawing, it does not have to be further defined or elaborated in the subsequent drawings.

It should be noted that, in the embodiments of the invention, N is a positive integer greater than or equal to 2.

Embodiments

Figure 2:
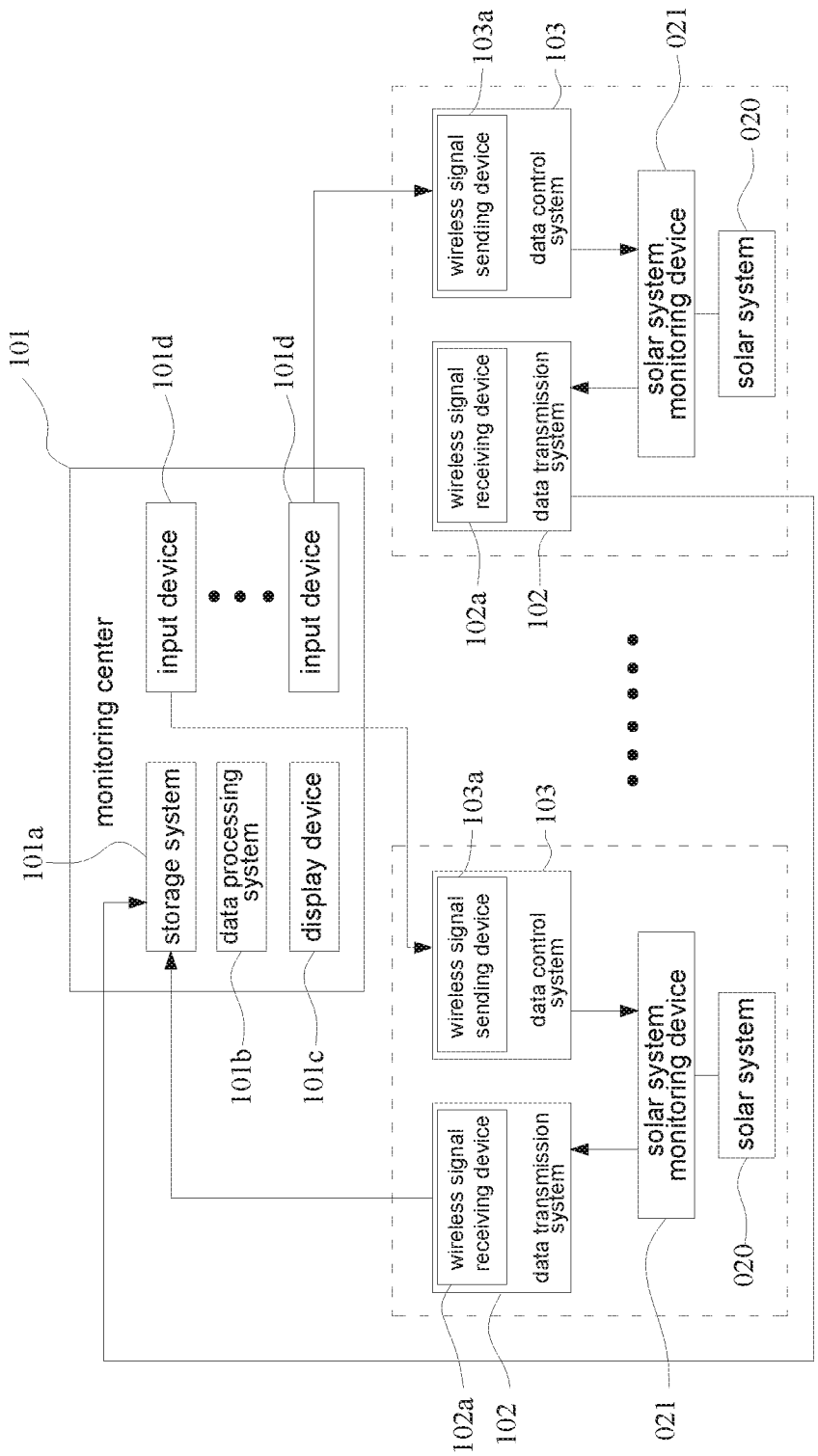
FIG. 2 is schematic diagram B of the monitoring system as provided by the embodiment.

Referring to FIG. 1 and FIG. 2, FIG. 1 is schematic diagram A of a monitoring system 010 as provided by the present embodiment, and FIG. 2 is schematic diagram B of the monitoring system 010 as provided in the present embodiment. As can be seen from FIG. 1 and FIG. 2, the monitoring system 010 includes a monitoring center 101, N data transmission systems 102 and N data control systems 103. Each of the N data transmission systems 102 is in communication with the monitoring center 101. Each of the N data control systems 103 is in communication with the monitoring center 101. The data transmission systems 102 realize data input for the monitoring center 101, and the data control systems 103 realize data output for the monitoring center 101. The N data transmission systems 102 correspond one-to-one to the N data control systems 103, namely, one of the data transmission systems 102 and one of the data control systems 103 form a group.

Still referring to FIG. 1 and FIG. 2, there are N solar systems 020, with each of the solar systems provided with a solar system monitoring device 021. Each group of the data transmission system 102 and the data control system 103 is in communication with the solar system monitoring device 021 of one solar system 020. The data transmission system 102 acquires a working parameter of the solar system monitoring device 021 with which the data transmission system 102 communicates, and the data transmission system sends the working parameter to the monitoring center 101. The data control system 103 receives a control instruction from the monitoring center 101, and sends, according to the control instruction 101, a control signal to the corresponding solar system monitoring device 021.

A working staff can get to know the working state of each of the solar systems 020 simply via the monitoring center 101, without a need for the working staff to carry out on-site data collection. An abnormality in the working parameter of the solar system monitoring device 021, i.e., a failure of the solar system 020, can also be timely found. If there is a need to change the working state of a solar system 020, the working staff simply needs to send a control instruction to the solar system monitoring device 021 via the monitoring system 010. In this way, it is possible to realize remote control over each of the solar systems 020, without a need to perform operations on-site. In the case where the N solar systems 020 are located at N different places (e.g., residences, office buildings, hospitals, schools, gymnasia, bathing centers, aquatic amusement parks, breeding farms, industrial parks at different places), the working parameters of the solar system monitoring devices 021 of the N solar systems 020 are monitored by the monitoring system 010 in a centralized manner, which can considerably reduce the cost in acquiring the working states of the individual solar systems 020.

In the present embodiment, the data transmission system 102 and the data control system 103 each are in wireless communication with the solar system monitoring device 021. Specifically, the data transmission system 102 includes a wireless signal receiving device 102a, and the data control system 103 includes a wireless signal sending device 103a. The wireless signal receiving device 102a is in communication with the monitoring center 101. The solar system monitoring device 021 sends out the working parameter thereof in a wireless signal, and the signal is received by the wireless signal receiving device 102a and then transmitted to the monitoring center 101. The wireless signal sending device 103a is in communication with the monitoring center 101. The wireless signal sending device 103a receives a control instruction from the monitoring center 101, and sends out, according to the control instruction, a control signal in the form of a wireless signal to the corresponding solar system monitoring device 021, and the control signal is received by the solar system monitoring device 021.

Furthermore, in the present embodiment, the monitoring center 101 includes a storage system 101a and a data processing system 101b, with the data processing system in communication with the storage system 101a. The storage system 101a is in communication with the N data transmission systems 102. The data transmission systems 102 send the working parameters of the solar system monitoring devices 021 to the storage system 101a for storage. The data processing system 101b is in communication with the storage system 101a. The data processing system 101b reads the working parameters stored in the storage system 101a, and outputs a working report according to the working parameters. The working report may be at least one of a real-time working report, a monthly working report and an annual working report of the solar system monitoring device 021.

In the present embodiment, the monitoring center 101 further includes a display device 101c. The display device 101c is in communication with the data processing system 101b. The working report is transmitted to the display device 101c, and displayed through the display device 101c. In this way, the working staff can intuitively view the working states of the N solar systems 020 simply via the display device 101c, which makes it easy for the working staff to monitor the N solar systems 020 simultaneously. The display device 101c is preferably a huge display screen, with the working reports of the individual solar system monitoring devices 021 collectively displayed on such a huge display screen. This makes it easier for the working staff to monitor the N solar systems 020 simultaneously.

Furthermore, in the present embodiment, the monitoring center 101 includes N input devices 101d. The N input devices 101d are in communication with the N data control systems 103 one-to-one correspondingly. The input device 101d receives an input operation from the working staff, and sends, according to the input operation, a control instruction to one corresponding data control system 103. In this way, the N solar system monitoring devices 021 can be controlled in parallel.

In the present embodiment, the working parameter includes at least one of an alarm signal, a temperature signal and a water level signal. The control signal includes a load control signal. The control instruction includes at least one of a startup instruction, a shutdown instruction, a target temperature value and a target water level value. Upon detecting an abnormal operation of a solar system 020, the solar system monitoring device 021 sends out an alarm signal. The alarm signal is transmitted to the monitoring center 101 via the data transmission system 102. After the alarm signal is detected, the working staff can be dispatched for maintenance. Alternatively, after receiving the alarm signal, the monitoring center may also send, according to a geographical location of the solar system monitoring device 021 for which the alarm signal is sent out, a maintenance dispatch instruction to the nearest maintenance staff. This can significantly reduce the maintenance cost, improve the maintenance efficiency, and realize intellectualization. It is also possible to send a control signal to the corresponding solar system monitoring device 021 via the data control system 103, so as to achieve remote control over the solar system 020, such that the failure can be troubleshoot or the solar system 020 can be shut down, thereby avoiding the losses caused by the failure. The solar system monitoring device 021 acquires a temperature value and a water level value of the solar system 020, and converts the temperature value and the water level value into a temperature signal and a water level signal, respectively. The temperature signal and the water level signal are transmitted to the monitoring center 101, via the data transmission system 102. In this way, the working staff can monitor the working temperatures and the working water levels of the N solar systems 020 in real time. If there is a need to shut down or start up a solar system 020 or change the working temperature or the working water level of a solar system 020, the working staff inputs, on the corresponding input device 101d, the startup instruction, the shutdown instruction, the target temperature value or the target water level value. In this case, the data control system 103 may send out a load control signal according to the control instruction, and the corresponding solar system monitoring device 021 controls, according to the load control signal, the load (for example, a water supply pump, a circulating pump, a make-up pump or an electric heater) of the solar system 020 to stop working, start working or change the working state.

In conclusion, the monitoring system 010 as provided by the present embodiment can simultaneously and remotely monitor, in a centralized manner, the working states of a plurality of solar systems 020 arranged at different locations, considerably reducing the operation and maintenance costs.

The present embodiment further provides a monitoring method that is realized on the basis of the above-described monitoring system 010. The monitoring method includes:

N data transmission systems 102 acquiring working parameters of N solar system monitoring devices 021, respectively, and sending the working parameters to a monitoring center 101;

the monitoring center 101 sending out a control instruction for each of the N solar system monitoring devices 021; and each of N data control systems 103 receiving a control instruction, and sending, according to the control instruction, a control signal to a corresponding one of the solar system monitoring devices 021;

where N is a positive integer greater than or equal to 2.

A working staff can get to know the working state of each of the solar systems 020 simply via the monitoring center 101, without a need for the working staff to carry out on-site data collection. An abnormality in the working parameter of the solar system monitoring device 021, i.e., a failure of the solar system 020, can also be timely found. If there is a need to change the working state of a solar system 020, the working staff simply needs to send a control instruction to the solar system monitoring device 021 via the monitoring system 010. In this way, it is possible to realize remote control over each of the solar systems 020, without a need to perform operations on-site. In the case where the N solar systems 020 are located at N different places (e.g., residences, office buildings, hospitals, schools, gymnasia, bathing centers, aquatic amusement parks, breeding farms, industrial parks at different places), the working parameters of the solar system monitoring devices 021 of the N solar systems 020 are monitored by the monitoring system 010 in a centralized manner, which can considerably reduce the cost in acquiring the working states of the individual solar systems 020.

Furthermore, the N data transmission systems 102 acquire, in wireless communication, the working parameters of the N solar system monitoring devices 021, respectively. Each of the N data control systems 103 sends, in wireless communication, the control signal to the corresponding solar system monitoring device 021.

Furthermore, the monitoring center 101 stores the working parameters from the N data transmission systems 102, and outputs working reports according to the working parameters. Furthermore, the monitoring center 101 displays the working reports, so that it is easy for the working staff to simultaneously monitor the N solar systems 020. It is preferable that the monitoring center 101 displays the working reports through a huge display screen, with the working reports of the individual solar system monitoring devices 021 collectively displayed on such a huge display screen. This makes it easier for the working staff to monitor the N solar systems 020 simultaneously.

Furthermore, the monitoring center 101 receives respectively input operations that a user inputs for the solar system monitoring devices 021, and sends the control instruction to the corresponding data control systems 103. In this way, the N solar system monitoring devices 021 can be controlled in parallel.

In the present embodiment, the working parameter includes at least one of an alarm signal, a temperature signal and a water level signal. The control signal includes a load control signal. The control instruction includes at least one of a startup instruction, a shutdown instruction, a target temperature value and a target water level value. Upon detecting an abnormal operation of a solar system 020, the solar system monitoring device 021 sends out an alarm signal. The alarm signal is transmitted to the monitoring center 101 via the data transmission system 102. After the alarm signal is detected, the working staff can be dispatched for maintenance. Alternatively, after receiving the alarm signal, the monitoring center may also send, according to a geographical location of the solar system monitoring device 021 for which the alarm signal is sent out, a maintenance dispatch instruction to the nearest maintenance staff. This can significantly reduce the maintenance cost, improve the maintenance efficiency, and realize intellectualization. It is also possible to send a control signal to the corresponding solar system monitoring device 021 via the data control system 103, so as to achieve remote control over the solar system 020, such that the failure can be troubleshoot or the solar system 020 can be shut down, thereby avoiding the losses caused by the failure. The solar system monitoring device 021 acquires a temperature value and a water level value of the solar system 020, and converts the temperature value and the water level value into a temperature signal and a water level signal, respectively. The temperature signal and the water level signal are transmitted to the monitoring center 101, via the data transmission system 102. In this way, the working staff can monitor the working temperatures and the working water levels of the N solar systems 020 in real time. If there is a need to shut down or start up a solar system 020 or change the working temperature or the working water level of a solar system 020, the working staff inputs, on the corresponding input device 101d, the startup instruction, the shutdown instruction, the target temperature value or the target water level value. In this case, the data control system 103 may send out a load control signal according to the control instruction, and the corresponding solar system monitoring device 021 controls, according to the load control signal, the load (for example, a water supply pump, a circulating pump, a make-up pump or an electric heater) of the solar system 020 to stop working, start working or change the working state.

In conclusion, the monitoring method as provided by the present embodiment can simultaneously and remotely monitor, in a centralized manner, the working states of a plurality of solar systems 020 arranged at different locations, considerably reducing the operation and maintenance costs.

INDUSTRIAL APPLICABILITY

With the monitoring system as provided by the embodiments of the invention, the working states of a plurality of solar systems arranged at different locations can be monitored simultaneously, without a need for a working staff to carry out the on-site data collection. An abnormality in the working parameter of the solar system monitoring device, i.e., a failure of the solar system, can also be timely found. Furthermore, the monitoring system can also simultaneously control, in a centralized manner, the working states of the plurality of solar systems arranged at different locations, without a need for the working staff to perform operations on site. In conclusion, by means of the monitoring system provided by the embodiments of the invention, it is possible to simultaneously and remotely monitor, in a centralized manner, the working states of the plurality of solar systems arranged at different locations, considerably reducing the operation and maintenance costs.

With the monitoring method as provided by the embodiments of the invention, the working states of a plurality of solar systems arranged at different locations can be monitored simultaneously, without a need for a working staff to carry out the on-site data collection. An abnormality in the working parameter of the solar system monitoring device, i.e., a failure of the solar system, can also be timely found. Furthermore, the monitoring method can also simultaneously control, in a centralized manner, the working states of the plurality of solar systems arranged at different locations, without a need for the working staff to perform operations on site. In conclusion, by means of the monitoring method provided by the embodiments of the invention, it is possible to simultaneously and remotely monitor, in a centralized manner, the working states of the plurality of solar systems arranged at different locations, considerably reducing the operation and maintenance costs.

The invention claimed is:

1. A monitoring system, applicable for parallel monitoring of N solar system monitoring devices, wherein the monitoring system comprises:
   a monitoring center;
   N data transmission systems, each being in communication with the monitoring center; and
   N data control systems, each being in communication with the monitoring center, and the N data control systems corresponding one-to-one to the N data transmission systems;
   wherein the N data transmission systems are configured to be in communication with the N solar system monitoring devices one-to-one correspondingly, the N data control systems are configured to be in communication with the N solar system monitoring devices one-to-one correspondingly, each of the data transmission systems is configured to acquire a working parameter of a corresponding one of the solar system monitoring devices and send the working parameter to the monitoring center; each of the data control systems is configured to receive a control instruction from the monitoring center, and send, according to the control instruction, a control signal to a corresponding one of the solar system monitoring devices; and N is a positive integer greater than or equal to 2.

2. The monitoring system according to claim 1, wherein each of the data transmission systems comprises a wireless signal receiving device, the wireless signal receiving device is configured to be in wireless communication with the corresponding one of the solar system monitoring devices, and in communication with the monitoring center.

3. The monitoring system according to claim 1, wherein each of the data control systems comprises a wireless signal sending device, the wireless signal sending device is configured to be in wireless communication with the corresponding one of the solar system monitoring devices, and in communication with the monitoring center.

4. The monitoring system according to claim 1, wherein the working parameter comprises an alarm signal, and the monitoring center is configured to send out a maintenance dispatch instruction, according to the alarm signal as well as a geographical location of the corresponding one of the solar system monitoring devices.

5. The monitoring system according to claim 1, wherein the monitoring center comprises a storage system and a data processing system with the data processing system in communication with the storage system; the storage system is in communication with the N data transmission systems and configured to store the working parameter; the data processing system is configured to read the working parameter stored in the storage system, and output a working report according to the working parameter; and the monitoring center further comprises a display device in communication with the data processing system, and the display device is configured to receive and display the working report.

6. The monitoring system according to claim 4, wherein the working report comprises at least one of a real-time working report of the solar system monitoring device, a monthly working report of the solar system monitoring device and an annual working report of the solar system monitoring device.

7. The monitoring system according to claim 1, wherein the monitoring center comprises N input devices, the N input devices are in communication with the N data control systems one-to-one correspondingly, and each of the input devices is configured to send a control instruction to a corresponding one of the data control systems.

8. The monitoring system according to claim 1, wherein the working parameter comprises at least one of an alarm signal, a temperature signal and a water level signal;
   the control signal comprises a load control signal; and
   the control instruction comprises at least one of a startup instruction, a shutdown instruction, a target temperature value and a target water level value.

9. A monitoring method, for monitoring in parallel N solar system monitoring devices, wherein the monitoring method comprises:
   N data transmission systems acquiring working parameters of the N solar system monitoring devices, respectively, and sending the working parameters to a monitoring center;
   the monitoring center sending out a control instruction for each of the N solar system monitoring devices; and
   each of N data control systems receiving the control instruction, and sending, according to the control instruction, a control signal to a corresponding one of the solar system monitoring devices;
   wherein N is a positive integer greater than or equal to 2.

10. The monitoring method according to claim 9, wherein the N data transmission systems acquire, in wireless communication, the working parameters of the N solar system monitoring devices, respectively.

11. The monitoring method according to claim 9, wherein each of the N data control systems sends, in wireless communication, the control signal to the corresponding one of the solar system monitoring devices.

12. The monitoring method according to claim 9, wherein the working parameter comprises an alarm signal, and the monitoring center is configured to send out a maintenance dispatch instruction, according to the alarm signal as well as a geographical location of the corresponding one of the solar system monitoring devices.

13. The monitoring method according to claim 9, wherein the monitoring center stores the working parameters from the N data transmission systems, and outputs and displays a working report according to the working parameters.

14. The monitoring method according to claim 13, wherein the working report comprises at least one of a real-time working report of the solar system monitoring device, a monthly working report of the solar system monitoring device and an annual working report of the solar system monitoring device.

15. The monitoring method according to claim 9, wherein the monitoring center receives respectively input operations that a user inputs for the solar system monitoring devices, and sends the control instruction to a corresponding one of the data control systems.

16. The monitoring method according to claim 9, wherein the working parameter comprises at least one of an alarm signal, a temperature signal and a water level signal;

the control signal comprises a load control signal; and the control instruction comprises at least one of a startup instruction, a shutdown instruction, a target temperature value and a target water level value.

\* \* \* \* \*